US012785025B2

(12) United States Patent
Hikosaka et al.

(10) Patent No.: US 12,785,025 B2
(45) Date of Patent: Nov. 3, 2026

(54) X-RAY TUBE

(71) Applicant: HAMAMATSU PHOTONICS K.K., Hamamatsu (JP)

(72) Inventors: Yasuhiro Hikosaka, Hamamatsu (JP); Taisuke Kitaoka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 182 days.

(21) Appl. No.: 18/918,508

(22) Filed: Oct. 17, 2024

(65) Prior Publication Data

US 2025/0191872 A1 Jun. 12, 2025

(30) Foreign Application Priority Data

Dec. 7, 2023 (JP) ................................ 2023-206844

(51) Int. Cl.

*H01J 35/16* (2006.01)
*H01J 35/04* (2006.01)
*H01J 35/06* (2006.01)
*H01J 35/08* (2006.01)

(52) U.S. Cl.

CPC ............ *H01J 35/16* (2013.01); *H01J 35/045* (2013.01); *H01J 35/064* (2019.05); *H01J 35/112* (2019.05); *H01J 2235/081* (2013.01)

(58) Field of Classification Search

CPC ......... H01J 35/16; H01J 35/064; H01J 35/112
See application file for complete search history.

(56) References Cited

U.S. PATENT DOCUMENTS

2005/0117705 A1* 6/2005 Morrison ................. G21K 1/06 378/136
2022/0093358 A1* 3/2022 Miller ..................... H01J 35/18

FOREIGN PATENT DOCUMENTS

JP 4712727 B2 6/2011
JP 2020-087727 A 6/2020
WO WO-2006/070586 A1 7/2006

* cited by examiner

*Primary Examiner* — Edwin C Gunberg

(74) *Attorney, Agent, or Firm* — Faegre Drinker Biddle & Reath LLP

(57) ABSTRACT

An X-ray tube includes: a vacuum envelope including an insulating valve having a first end portion and a second end portion, and a metal portion joined to the first end portion; an electron gun held at the first end portion via the metal portion in the vacuum envelope and emitting electrons; and a target held at the second end portion and generating X-rays by receiving the electrons emitted from the electron gun. A ratio C defined by the following Formula (1) is 55% or more at the first end portion, $$C = 100\times([K]+[R_1]+[R_2])/[Na]. \quad (1)$$

In the Formula (1), [Na] represents a content (atom %) of sodium, [K] represents a content (atom %) of potassium, $[R_1]$ represents a content (atom %) of an alkali metal element having an atomic number larger than that of potassium, and $[R_2]$ represents a content (atom %) of an alkaline earth metal element.

17 Claims, 3 Drawing Sheets

X-RAY TUBE

TECHNICAL FIELD

The present invention relates to an X-ray tube.

BACKGROUND

As an X-ray tube used for a microfocus X-ray source or the like, an X-ray tube including a vacuum envelope having a cylindrical insulating valve, an electron gun that is provided in the vacuum envelope and emits electrons emitted from a cathode, a target that generates X-rays by receiving the electrons emitted from the electron gun, and a metal target holder that holds the target is known.

In an X-ray tube described in Japanese Unexamined Patent Publication No. 2020-087727, a glass container which is an insulating valve has two end portions, a target holder is fixed to one end portion, and an X-ray transmission assembly is fixed to the other end portion.

In an X-ray tube described in Japanese Patent No. 4712727, an insulating valve has two end portions, a target holder is fixed to one end portion, and a metal barrel portion housing an electron gun is fixed to the other end portion.

SUMMARY

However, each of the X-ray tubes described in Japanese Unexamined Patent Publication No. 2020-087727 and Japanese Patent No. 4712727 has room for improvement in terms of suppression of generation of a void in the insulating valve during operation.

Therefore, an object of the present invention is to provide an X-ray tube capable of suppressing generation of a void in an insulating valve during operation.

In order to solve the above problem, the present inventors first prepared a structure formed by fusion-connecting a first metal member and a second metal member to both ends of a glass valve that is a cylindrical insulating valve, and put the structure in a furnace set at 400° C., which is extremely higher than a temperature of the insulating valve during normal operation, under an atmospheric pressure atmosphere, and conducted an experiment in which in the structure, the second metal member was connected to a positive electrode side of a power supply, the first metal member was connected to a negative electrode side of the power supply, and a high DC voltage was applied between the first metal member and the second metal member. Then, when an interface between the first metal member and the glass valve and a vicinity of an interface between the second metal member and the glass valve were observed with a microscope, it was found that a void was formed due to cracking or peeling in a certain structure. In addition, it was in the vicinity of the interface between the first metal member and the glass valve that the void was formed. On the other hand, in the structure, as a result of performing SEM analysis and element mapping analysis on an element in the vicinity of a portion where the void was observed inside or on a surface of the glass valve due to the cracking or peeling, it was found that sodium was aggregated around the void. Sodium is generally used as an element configuring glass, and particularly, in an X-ray tube to which a high voltage is applied, an X-ray tube having a high sodium content for the purpose of improving withstand voltage characteristics may be used. From this, the present inventors thought that at least at an end portion of the glass valve joined to the first metal member, deterioration of physical properties (adhesion and mechanical strength) of the end portion can be suppressed by making a content of sodium relatively small with respect to a total content of potassium, an alkali metal element having an atomic number larger than that of potassium, and an alkaline earth metal element. Therefore, as a result of further intensive studies, the present inventors have found that the above problem can be solved by setting a ratio of the total content of potassium, the alkali metal element having the atomic number larger than that of potassium, and the alkaline earth metal element with respect to the content of sodium to a predetermined value or more, and completed the present invention.

That is, an X-ray tube of the present invention is [1] "an X-ray tube including: a vacuum envelope including an insulating valve having a first end portion and a second end portion, and a metal portion joined to the first end portion; an electron gun held at the first end portion via the metal portion in the vacuum envelope and configured to emit electrons; and a target held at the second end portion and configured to generate X-rays by receiving the electrons emitted from the electron gun, in which a ratio C defined by the following Formula (1) is 55% or more at the first end portion".

$$C = 100\times([\mathrm{K}] + [R_1] + [R_2])/[\mathrm{Na}] \quad (1)$$

(In the Formula (1), [Na] represents a content (atom %) of sodium, [K] represents a content (atom %) of potassium, $[R_1]$ represents a content (atom %) of an alkali metal element having an atomic number larger than that of potassium, and $[R_2]$ represents a content (atom %) of an alkaline earth metal element.)

According to the X-ray tube of [1], since the target is held at the second end portion and the electron gun is held at the first end portion via the metal portion, when a high voltage is applied between the electron gun (metal portion) and the target in order to cause the electrons from the electron gun to be incident on the target with desired energy, the high voltage is applied between the first end portion and the second end portion of the insulating valve. Even in this case, according to the X-ray tube of the present invention, by setting the content of sodium ([Na]) relatively small with respect to the total content of potassium, the alkali metal element having the atomic number larger than that of potassium, and the alkaline earth metal element ($[K]+[R_1]+[R_2]$), deterioration of the physical properties (adhesion and mechanical strength) of the first end portion can be suppressed, and generation of a void in the first end portion can be suppressed, so that generation of a void in the insulating valve can be suppressed.

The X-ray tube of the present invention may be [2] "the X-ray tube according to [1] above, in which the ratio C defined by the following Formula (1) is 55% or more at the second end portion".

According to the X-ray tube of [2], also at the second end portion, by setting the content of sodium ([Na]) relatively small with respect to the total content of potassium, the alkali metal element having the atomic number larger than that of potassium, and the alkaline earth metal element ($[K]+[R_1]+[R_2]$), deterioration of the physical properties (adhesion and mechanical strength) of the second end portion can be suppressed, and generation of a void in the second end portion can be suppressed, so that generation of a void in the insulating valve can be further suppressed.

The X-ray tube of the present invention may be [3] "the X-ray tube according to [2] above, in which the insulating valve further has a valve main body portion between the first end portion and the second end portion, and the ratio C is 55% or more at the valve main body portion".

According to the X-ray tube of [3], not only in the first end portion and the second end portion but also in the valve main body portion, by setting the content of sodium ([Na]) relatively small with respect to the total content of potassium, the alkali metal element having the atomic number larger than that of potassium, and the alkaline earth metal element ([K]+[$R_1$]+[$R_2$]), deterioration of the physical properties (adhesion and mechanical strength) of the entire insulating valve can be suppressed, and generation of a void in the insulating valve can be further suppressed.

The X-ray tube of the present invention may be [4] "the X-ray tube according to any one of [1] to [3] above, in which the ratio C is 63% or more at the first end portion".

According to the X-ray tube of [4], by applying a high voltage between the electron gun and the target in order to cause the electrons from the electron gun to be incident on the target with desired energy, it is possible to suppress generation of a void in the first end portion of the insulating valve and suppress generation of a void in the insulating valve even when a higher voltage is applied between the metal portion and the metal joint portion.

The X-ray tube of the present invention may be [5] "the X-ray tube according to any one of [1] to [4] above, in which the ratio C is 1000% or less at the first end portion".

The X-ray tube of the present invention may be [6] "the X-ray tube according to any one of [1] to [5], in which the content of sodium in the first end portion is 2.20 atom % or less".

According to the X-ray tube of [6], the content of sodium in the first end portion is 2.20 atom % or less. Therefore, by applying a high voltage between the electron gun and the target in order to cause the electrons from the electron gun to be incident on the target with desired energy, it is possible to effectively suppress generation of a void in the first end portion of the insulating valve and effectively suppress generation of a void in the insulating valve even when a higher voltage is applied between the metal portion and the metal joint portion.

DETAILED DESCRIPTION

Figure 1:
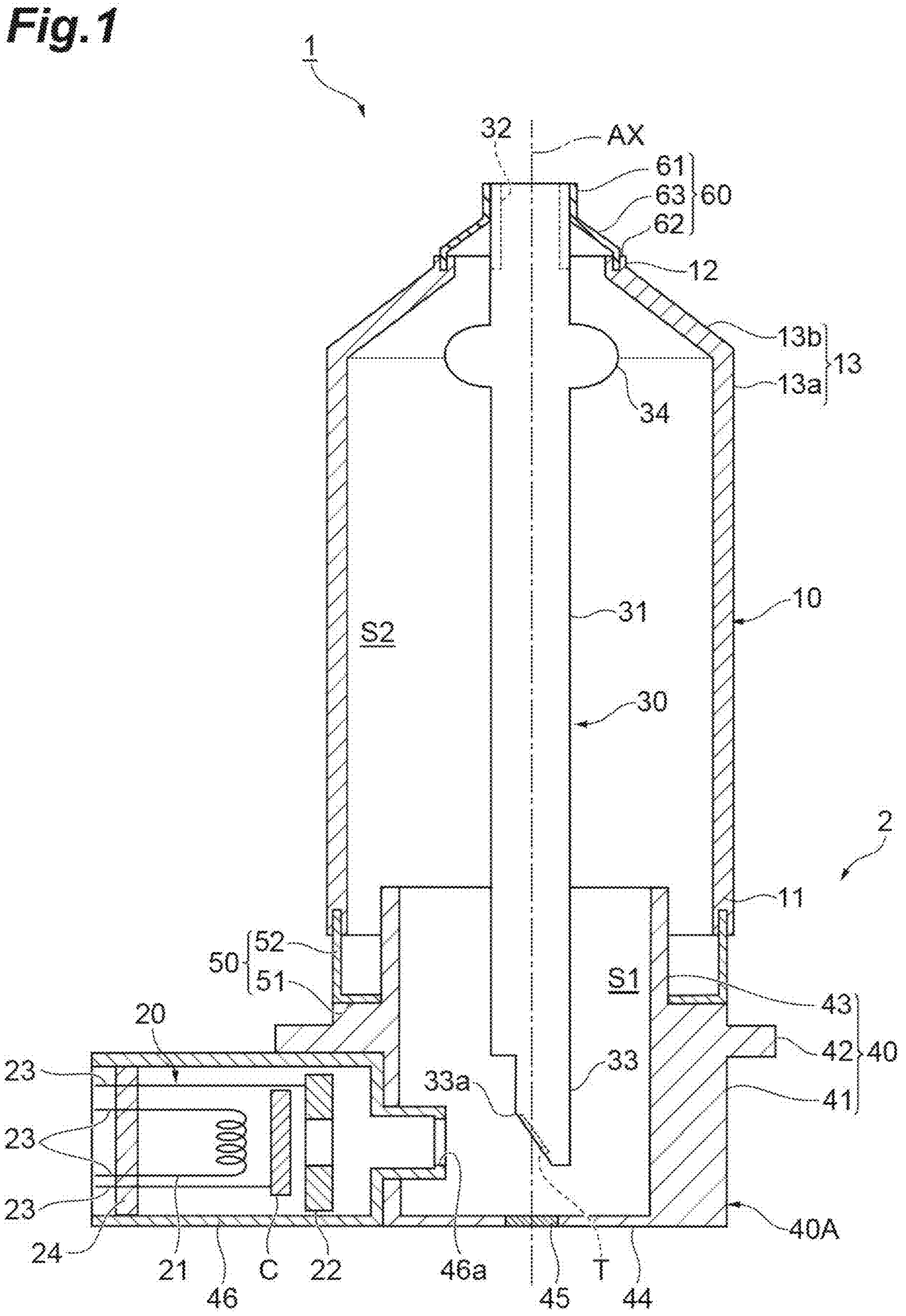
FIG. 1 is a cross-sectional view illustrating an embodiment of an X-ray tube of the present invention.

Hereinafter, an embodiment of the present invention will be described in detail with reference to the drawings. In the drawings, the same or corresponding parts are denoted by the same reference signs, and redundant description will be omitted.

The X-ray tube 1 illustrated in FIG. 1 is a so-called reflective X-ray tube, and includes a vacuum envelope 2, an electron gun 20, a target T, and a target holder 30. The electron gun 20 emits electrons toward the target T. The target T generates X-rays by receiving the electrons emitted from the electron gun 20. The target holder 30 is a metal member that holds the target T.

The vacuum envelope 2 includes an insulating valve 10 having a first end portion 11 and a second end portion 12, and a metal portion 40A joined to the first end portion 11 of the insulating valve 10.

The metal portion 40A includes a metal housing 40 having a columnar internal space S1, and a first joint portion 50 made of metal that joins the first end portion 11 of the insulating valve 10 and the metal housing 40.

The X-ray tube 1 includes a second joint portion 60 made of metal that joins the second end portion 12 of the insulating valve 10 and the target holder 30.

Here, the first joint portion 50 and the second joint portion 60 may be made of metal, and may not be configured as independent members.

For example, the first joint portion 50 may be configured as a part of the metal housing 40, and the second joint portion 60 may be configured as a part of the target holder 30.

The insulating valve 10 is formed in a substantially tubular shape and has an internal space S2 communicating with the internal space S1 of the metal housing 40. The internal space S1 and the internal space S2 are vacuum. The insulating valve 10 includes a valve main body portion 13 between the first end portion 11 and the second end portion 12. The valve main body portion 13 includes a cylindrical portion 13*a*, and a tapered portion 13*b* connecting the cylindrical portion 13*a* and the second end portion 12 and tapering from the cylindrical portion 13*a* toward the second end portion 12.

The metal housing 40 has a cylindrical portion 41, a flange 42 projecting outward from the cylindrical portion 41, an extending portion 43 extending along a tube axis AX from an end surface of the cylindrical portion 41 on the first joint portion 50 side, a bottom portion 44 closing an opening of the cylindrical portion 41 on a side opposite to the insulating valve 10, and an electron gun housing portion 46 housing the electron gun 20. The metal housing 40 is made of a metal material such as stainless steel or Kovar metal. An opening is formed in the bottom portion 44, and an X-ray emission window 45 for emitting X-rays generated by the target T is fixed to the opening. A material of the X-ray emission window 45 is an X-ray transmission material, and is made of, for example, beryllium or aluminum. The flange 42 is provided on an outer periphery of the cylindrical portion 41, and is a portion that supports the X-ray tube 1 in an X-ray generator (not illustrated). A tip portion of the extending portion 43 is inserted into the internal space S2 of the insulating valve 10 and is interposed between the first end portion 11 of the insulating valve 10 and the target holder 30. As a result, discharge between the first end portion 11 of the insulating valve 10 and the target holder 30 is suppressed.

The first joint portion 50 joins the first end portion 11 of the insulating valve 10 and the metal housing 40. The first joint portion 50 includes an annular support portion 51 provided outside the extending portion 43 on the surface of the cylindrical portion 41 of the metal housing 40 on the insulating valve 10 side, and a ring portion 52 extending from an outer peripheral edge portion of the support portion 51 along an extending direction of the extending portion 43. The first joint portion 50 (ring portion 52) and the insulating valve 10 (first end portion 11) are airtightly joined by fusion. The first joint portion 50 (support portion 51) and the metal housing 40 are airtightly joined by welding. A material of the first joint portion 50 (the support portion 51 and the ring portion 52) is, for example, Kovar metal, and a material having a thermal expansion coefficient close to a thermal expansion coefficient of a material configuring the insulating valve 10 (the first end portion 11) is preferably employed. A tip portion of the ring portion 52 is buried in the first end portion 11 of the insulating valve 10. Therefore, the insulating valve 10 is firmly fixed to the metal housing 40 via the first joint portion 50.

The second joint portion 60 includes a tubular fixing portion 61 fixed to the target holder 30, a ring portion 62 joined to the second end portion 12 of the insulating valve 10, and a tapered intermediate portion 63 coupling the fixing portion 61 and the ring portion 62. The second joint portion 60 (fixing portion 61) and the target holder 30 are airtightly joined by welding. The second joint portion 60 (ring portion 62) and the insulating valve 10 (second end portion 12) are airtightly joined by fusion. A material of the second joint portion 60 (the fixing portion 61 and the ring portion 62) is, for example, Kovar metal, and a material having a thermal expansion coefficient close to that of the material configuring the insulating valve 10 (the second end portion 12) is preferably employed. When the fixing portion 61 of the second joint portion 60 is joined to a coupling portion 32 of the target holder 30, the second joint portion 60 is fixed to the target holder 30.

The electron gun 20 is held at the first end portion 11 of the insulating valve 10 via the cylindrical portion 41 of the metal portion 40A and the first joint portion 50 in the vacuum envelope 2, and includes a cathode C that emits electrons, a heater 21, a grid electrode 22, power supply pins 23, and an insulating stem 24.

The cathode C, the heater 21, and the grid electrode 22 are attached to the stem 24 via a plurality of power supply pins 23 extending in parallel.

The cathode C, the heater 21, and the grid electrode 22 are supplied with power from the outside via the corresponding power supply pins 23. A predetermined potential is applied to the cathode C, the heater 21, and the grid electrode 22 by the power supply pins 23, electrons are emitted from the cathode C by heating the cathode C by the heater 21, and the emitted electrons pass through an opening portion 46*a* of the electron gun housing portion 46 while being focused by the grid electrode 22, and are emitted toward the target.

The electron gun housing portion 46 is formed in a cylindrical shape, is fixed to the metal housing 40, and the electron gun housing portion 46 and the metal housing 40 are electrically connected to each other. An internal space of the electron gun housing portion 46 communicates with the internal space S1 and the internal space S2 via the opening portion 46*a*. Therefore, the electron gun housing portion 46 configures a part of the metal housing 40 configuring the vacuum envelope 2.

The target T is disposed on the first end portion 11 side of the insulating valve 10 in the vacuum envelope 2, and is held at the second end portion 12 via the second joint portion 60. The target T is a plate-shaped member serving as an anode, and is made of, for example, a high melting point metal material such as tungsten or molybdenum. The target T is located on the tube axis AX of the X-ray tube 1 (a center axis of the cylindrical portion 13*a* of the insulating valve 10). The target T is accommodated in the metal housing 40 (internal space S1).

The target holder 30 is inserted into the vacuum envelope 2. The target holder 30 includes a columnar main body portion 31 extending along the tube axis AX, a tubular coupling portion 32 supported by the second joint portion 60 in the main body portion 31, a rod-shaped portion 33 extending along the tube axis AX from an end portion on the housing 40 side in the main body portion 31, and a projecting portion 34 projecting outward from the main body portion 31. A tip end surface of the rod-shaped portion 33 is an inclined surface 33*a* inclined with respect to the tube axis AX, and the target T is disposed on the inclined surface 33*a* and is electrically connected to the target holder 30.

At the first end portion 11 of the insulating valve 10, a ratio C defined by the following Formula (1) is 55% or more.

$$C = 100 \times ([K] + [R_1] + [R_2])/[Na] \tag{1}$$

In the Formula (1), [Na] represents a content (atom %) of sodium, [K] represents a content (atom %) of potassium, $[R_1]$ represents a content (atom %) of an alkali metal element having an atomic number larger than that of potassium, and $[R_2]$ represents a content (atom %) of an alkaline earth metal element. Here, the content (atom %) is an atom 100 fraction.

According to the X-ray tube 1, since the target T is held at the second end portion 12 via the second joint portion 60, and the electron gun 20 is held at the first end portion 11 via the metal portion 40A, when a high voltage is applied between the electron gun 20 (metal portion 40A) and the target T in order to cause electrons from the electron gun 20 to be incident on the target T with desired energy, the high voltage is applied between the first end portion 11 and the second end portion 12 of the insulating valve 10. More specifically, in the present embodiment, desired energy is obtained by applying a positive high voltage to the target T via the target holder 30. In this case, since the target T, the target holder 30, and the second joint portion 60 have the same potential, the high voltage is applied to all of them. On the other hand, the metal housing 40, the electron gun housing portion 46, and the first joint portion 50 have the same potential in a state of a potential relatively lower than the target T, for example, a ground potential. That is, since the high voltage is also applied between the first joint portion 50 and the second joint portion 60, the high voltage is also applied between the first end portion 11 and the second end portion 12 of the insulating valve 10. Even in this case, according to the X-ray tube 1, by setting the content of sodium ([Na]) relatively small with respect to the total content of potassium, an alkali metal element having an atomic number larger than that of potassium, and an alkaline earth metal element ($[K]+[R_1]+[R_2]$), deterioration of physical properties (adhesion and mechanical strength) of the first end portion 11 can be suppressed, and generation of a void in the first end portion 11 can be suppressed, so that generation of a void in the insulating valve 10 can be suppressed.

Here, the insulating valve 10 will be described in more detail.

Figure 2:
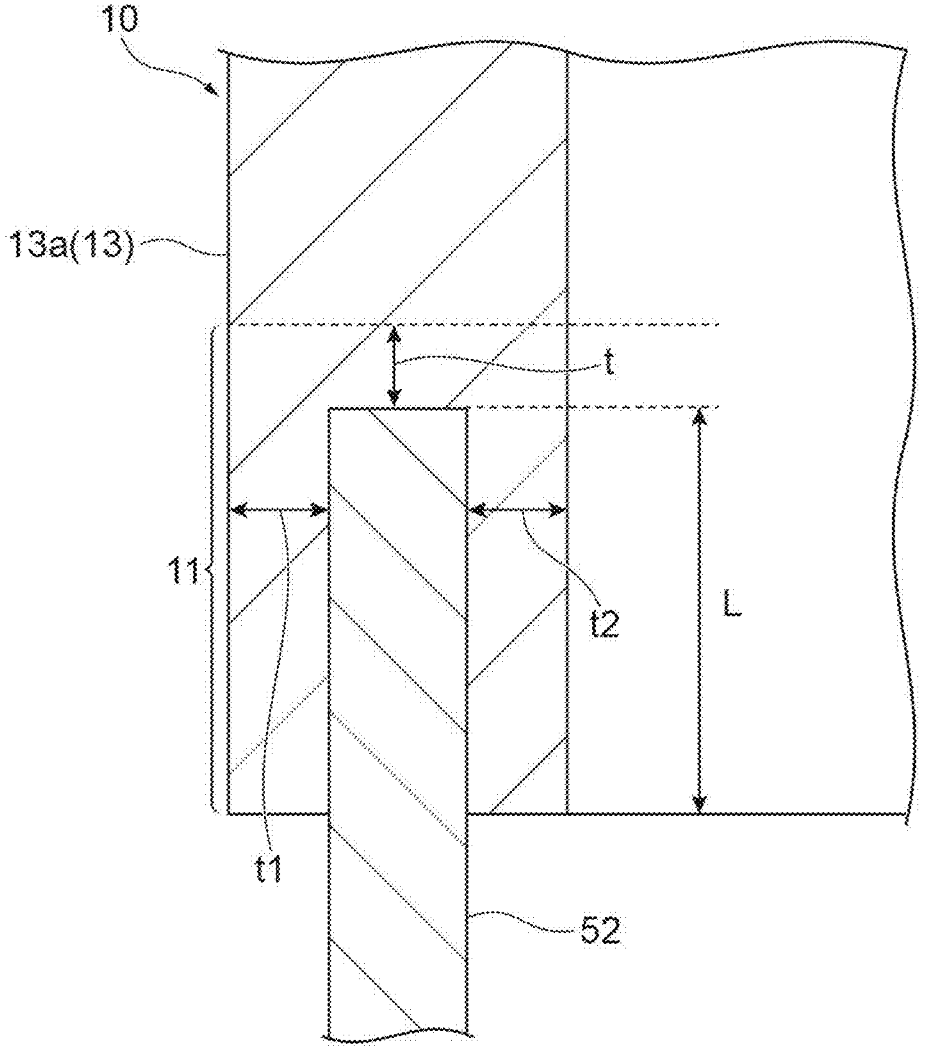
FIG. 2 is a partially enlarged view illustrating a joint region between an insulating valve and a first joint portion in FIG. 1.

As illustrated in FIG. 2, the first end portion 11 of the insulating valve 10 is a portion from an end surface thereof on the housing 40 side to a position of a total length of a length L of the ring portion 52 along the extending direction and a length t of the first end portion 11 in a direction along an outer peripheral surface. Here, L is a length of a portion of the ring portion 52 buried in the first end portion 11 (hereinafter, also referred to as "buried portion"), and t is a length along the outer peripheral surface of the first end portion 11, and refers to a length calculated by an arithmetic average of a thickness t1 from an outer peripheral surface of the buried portion to the outer peripheral surface of the first end portion 11 and a thickness t2 from an inner peripheral surface of the buried portion to an inner peripheral surface of the first end portion 11.

The second end portion 12 is a portion from an end surface thereof opposite to the valve main body portion 13 to a position of a total length of a length of the buried portion of the ring portion 62 buried in the second end portion 12 along the extending direction and a length of the second end portion 12 in a direction along an outer peripheral surface. Here, the length of the second end portion 12 in the direction along the outer peripheral surface refers to a length calculated by an arithmetic average of a thickness from the outer peripheral surface of the buried portion of the ring portion 62 to the outer peripheral surface of the second end portion 12 and a thickness from the inner peripheral surface of the buried portion to an inner peripheral surface of the second end portion 12.

The insulating valve 10 is made of an insulating material. As the insulating material, for example, glass or ceramics is used.

In the above Formula (1), examples of the alkali metal element represented by $R_1$ include cesium and rubidium.

Examples of the alkaline earth metal element represented by $R_2$ include calcium, magnesium, strontium, and barium.

At the first end portion 11, the ratio C may be 55% or more, and may be 60% or more, 63% or more, or 70% or more.

However, when the ratio C is 63% or more, even when a higher voltage is applied between the first joint portion 50 and the second joint portion 60, generation of a void in the first end portion 11 can be suppressed, and generation of a void in the insulating valve 10 can be suppressed.

When the ratio C is 55% or more, the ratio C may be 1000% or less, 900% or less, or 800% or less.

The content of sodium in the first end portion 11 is not particularly limited, and may be 2.20 atom % or less. In this case, by setting the content of sodium in the first end portion 11 to 2.20 atom % or less, even when a high voltage is applied between the first joint portion 50 and the second joint portion 60, generation of a void in the first end portion 11 can be effectively suppressed, and generation of a void in the insulating valve 10 can be effectively suppressed.

The content of sodium in the first end portion 11 may be 2.0 atom % or less, 1.0 atom % or less, or 0.5 atom % or less.

In the insulating valve 10, the ratio C may be 55% or more at the first end portion 11, and the ratio C may be 55% or more or less than 55% at the second end portion 12 and the valve main body portion 13, respectively.

For example, the ratio C may be 55% or more at the first end portion 11 and the second end portion 12, and the ratio C may be less than 55% at the valve main body portion 13.

In this case, also at the second end portion 12, by setting the content of sodium ([Na]) relatively small with respect to the total content of potassium, the alkali metal element having the atomic number larger than that of potassium, and the alkaline earth metal element ($[K]+[R_1]+[R_2]$), deterioration of the physical properties (adhesion and mechanical strength) of the second end portion 12 can be suppressed, and generation of a void in the second end portion 12 can be suppressed, so that generation of a void in the insulating valve 10 can be further suppressed. By setting the ratio C at the valve main body portion 13 to less than 55% (that is, by increasing the content of sodium), withstand voltage characteristics of the insulating valve 10 are improved. Therefore, it is possible to achieve both suppression of generation of a void in the insulating valve 10 and withstand voltage characteristics.

In addition, the ratio C may be 55% or more at the first end portion 11, the valve main body portion 13, and the second end portion 12 (that is, in the entire insulating valve 10).

In this case, not only in the first end portion 11 and the second end portion 12 but also in the valve main body portion 13, by setting the content of sodium ([Na]) relatively small with respect to the total content of potassium, the alkali metal element having the atomic number larger than that of potassium, and the alkaline earth metal element ($[K]+[R_1]+[R_2]$), deterioration of the physical properties (adhesion and mechanical strength) of the entire insulating valve 10 can be suppressed, and generation of a void in the entire insulating valve 10 can be further suppressed.

The ratio C may be 55% or more at the first end portion 11, and the ratio C may be less than 55% at the valve main body portion 13 and the second end portion 12.

The value of the ratio C can be increased by decreasing [Na] or increasing $[K]+[R_1]+[R_2]$. Conversely, the value of the ratio C can be decreased by increasing [Na] or decreasing $[K]+[R_1]+[R_2]$. The increase or decrease of [Na] can be performed, for example, by increasing or decreasing the additive amount of sodium oxide as a raw material at the time of manufacturing the insulating valve 10 such as glass, and the increase or decrease of $[K]+[R_1]+[R_2]$ can be performed, for example, by increasing or decreasing the additive amounts of potassium oxide, the alkali metal oxide containing an alkali metal element having the atomic number larger than that of potassium, or the alkaline earth metal oxide as raw materials at the time of manufacturing the insulating valve 10 such as glass.

[Na], [K], $[R_1]$, and $[R_2]$ refer to values measured using an X-ray fluorescence analysis (XRF) method. Specifically, [Na], [K], $[R_1]$, and $[R_2]$ refer to values measured under the following measurement conditions using the following apparatus.

(Apparatus)

ZSX Primus (manufactured by Rigaku Corporation)

(Measurement Conditions)

Analysis mode: Qualitative analysis mode

Tube voltage: 30 to 50 kV

Tube current: 60 to 100 mA

X-ray irradiation range: Φ10 to 20 mm

Although the embodiment of the present invention has been described above, the present invention is not limited to the above embodiment.

Figure 3:
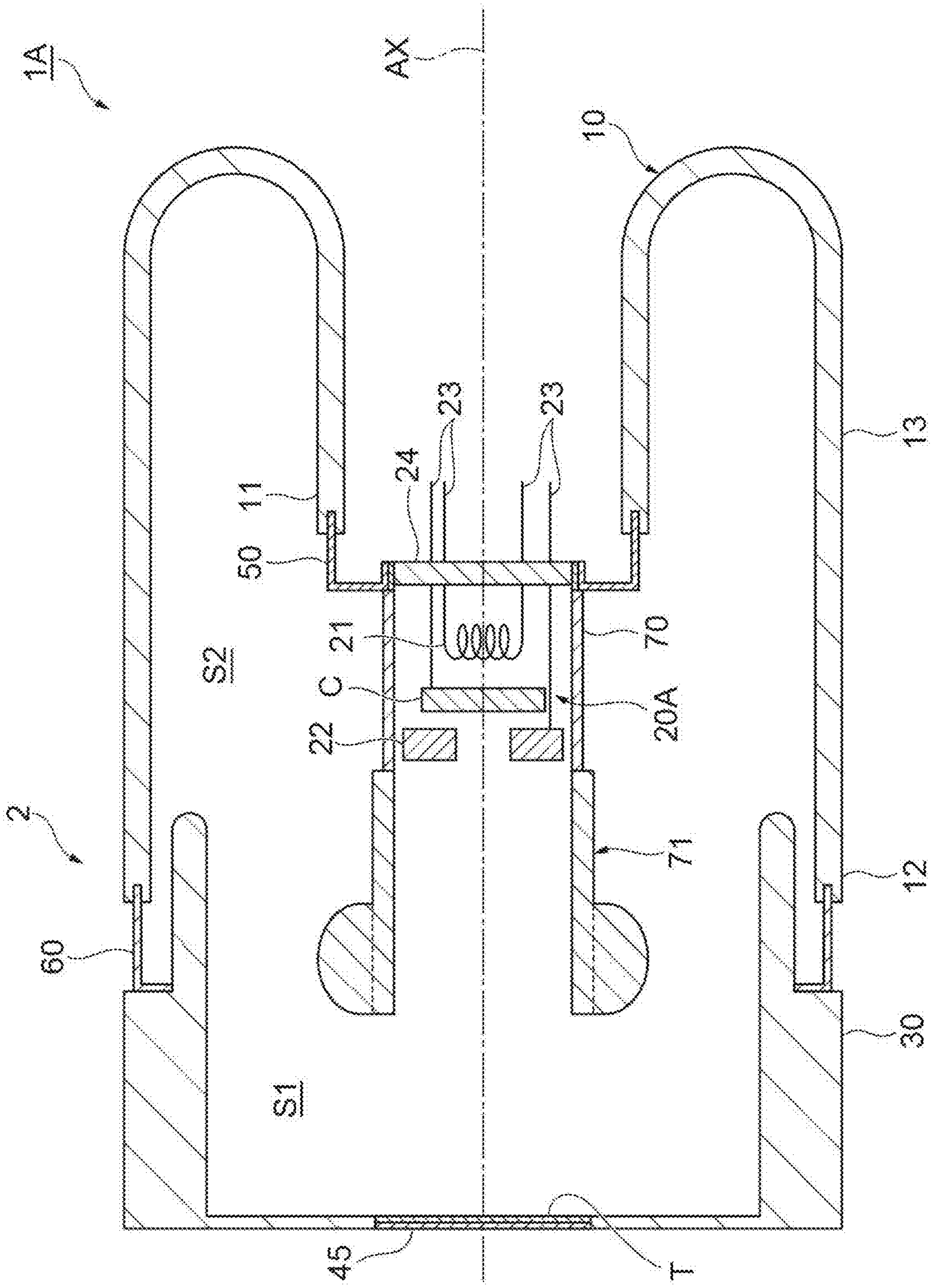
FIG. 3 is an end view illustrating another embodiment of the X-ray tube of the present invention.

For example, the X-ray tube 1 of the above embodiment is a so-called reflective X-ray tube, but the present invention is also applicable to a transmission type X-ray tube. FIG. 3 is an end view illustrating a transmission type X-ray tube as another embodiment of the X-ray tube of the present invention. In a transmission type X-ray tube 1A illustrated in FIG. 3, a vacuum envelope is configured by the insulating valve 10, the target holder 30, and the X-ray emission window 45. Here, the target holder 30 is a metal housing. The target T is provided on the vacuum side surface (electron gun 20A side) of the X-ray emission window 45. In the X-ray tube 1A, a material of the X-ray emission window 45 is, for example, diamond, the target T is a thin film made of a high melting point metal material such as tungsten or molybdenum, and the target holder 30, the X-ray emission window 45, the target T, and the second joint portion 60 are electrically connected. In the X-ray tube 1A, a potential (for example, a ground potential in the present embodiment) is applied to the X-ray emission window 45 and the target T via the target holder 30. On the other hand, the electron gun 20A has a cylindrical support member 70 made of metal and a second grid electrode 71 supported by the support member 70, and a relatively negative high potential is applied to the target T. The electron gun 20A is held at the first end portion 11 of the insulating valve 10 via the first joint portion 50. The first joint portion 50 is electrically connected to the second grid electrode 71 via the support member 70, and has the same potential as the second grid electrode 71 and the support member 70. In the present embodiment, the first joint portion 50 is a metal portion. When a high voltage is applied between the target T and the electron gun 20A, since the high voltage is also applied between the first joint portion 50 and the second joint portion 60, the high voltage is also applied between the first end portion 11 and the second end portion 12 of the insulating valve 10.

The first joint portion 50 and the second joint portion 60 may be made of metal, and may not be configured as independent members. For example, the first joint portion 50 is a member independent of the support member 70, but may be configured as a part of the support member 70. The second joint portion 60 is a member independent of the target holder 30, but may be configured as a part of the target holder 30. In this case, the target T is joined to the second end portion 12 via the target holder 30.

Further, in the present embodiment, the electron gun 20A is held at the first end portion 11 of the insulating valve 10 via the first joint portion 50, but electrode members (for example, the second grid electrode 71 and the support member 70) configuring the electron gun 20A may be directly held at the first end portion 11 of the insulating valve 10. In this case, the electrode member is a metal portion.

In the above embodiment, a part of the electron gun 20 is disposed in the internal space S1 of the metal housing 40, but the electron gun 20 only needs to be disposed in the vacuum envelope 2, and for example, the entire electron gun may be disposed in the internal space S2 of the insulating valve 10.

EXPERIMENTAL EXAMPLES

Hereinafter, the effects of the present invention will be verified by using experimental examples.

Experimental Example 1

First, a structure including a glass valve as the insulating valve 10, the first joint portion 50, and the second joint portion 60 in the X-ray tube 1 illustrated in FIG. 1 was prepared. Specifically, by heating the ring portion 52 of the first joint portion 50 to the first end portion 11 of the insulating valve 10, the first end portion 11 was melted and fused (sealed) with the ring portion 52, and a part thereof was buried in the first end portion 11. On the other hand, by heating the ring portion 62 of the second joint portion 60 to the second end portion 12 of the insulating valve 10, the second end portion 12 was melted and fused (sealed) with the ring portion 62, and a part thereof was buried in the second end portion 12. In this way, a structure was prepared.

The insulating valve 10, the first joint portion 50, and the second joint portion 60 were configured as follows.

(Insulating Valve 10)

As the glass, glass containing 67.46 atom % of oxygen, 19.52 atom % of silicon, and 6.18 atom % of boron, and having a content of sodium ([Na]), a content of potassium ([K]), a content of $R_1$ ([$R_1$]), a content of $R_2$ ([$R_2$]), and a ratio C as indicated in Table 1 was used. In Table 1, "-" indicates that $R_1$ was not observed.

(First Joint Portion 50)

Material: Kovar metal (Second Joint Portion 60)

Material: Kovar metal

Experimental Example 2

A structure was produced in the same manner as in Experimental Example 1 except that, as the glass, glass containing 68.18 atom % of oxygen, 18.70 atom % of silicon, and 8.45 atom % of boron and having a content of sodium ([Na]), a content of potassium ([K]), a content of $R_1$ ([$R_1$]), a content of $R_2$ ([$R_2$]), and a ratio C as indicated in Table 1 was used.

Experimental Example 3

A structure was produced in the same manner as in Experimental Example 1 except that, as the glass, glass containing 67.23 atom % of oxygen, 19.82 atom % of silicon, and 8.61 atom % of boron and having a content of sodium ([Na]), a content of potassium ([K]), a content of $R_1$ ([$R_1$]), a content of $R_2$ ([$R_2$]), and a ratio C as indicated in Table 1 was used.

Experimental Example 4

A structure was produced in the same manner as in Experimental Example 1 except that, as the glass, glass containing 66.51 atom % of oxygen, 16.79 atom % of silicon, and 8.16 atom % of boron and having a content of sodium ([Na]), a content of potassium ([K]), a content of $R_1$ ([$R_1$]), a content of $R_2$ ([$R_2$]), and a ratio C as indicated in Table 1 was used.

<Evaluation>

(Test 1)

The structures of Experimental Examples 1 to 4 were placed in a furnace set at 400° C., left standing in the air atmosphere for 3600 seconds, and then subjected to Test 1 in which an applied voltage (DC voltage) of 1 kV was applied. The retention time of the structures after being put into the furnace was set to one hour. The voltage was applied in a state in which the first end portion was connected to the negative electrode side of the power supply, and the second end portion was connected to the positive electrode side of the power supply.

(Test 2)

Test 2 was performed in the same manner as in Test 1 except that the applied voltage was 3 kV. However, in the structure of Experimental Example 4, generation of a void was confirmed in Test 1, and therefore Test 2 was not performed. Therefore, in Table 1, "-" is displayed for Test 2.

(Observation of Void)

After completion of Test 1, the vicinity of the interface between the ring portion 52 of the first end portion 11 and the first end portion 11 in the structures was observed with a microscope to examine whether a void such as cracking or peeling occurred.

After completion of Test 2, it was examined in the same manner as described above whether a void such as cracking or peeling were generated. The results are indicated in Table 1.

TABLE 1

| | Na atom % | K atom % | $R_1$ atom % | $R_2$ atom % | Ratio C % | Presence or absence of voids Test 1 1 kV | Test 2 3 kV |
|---|---|---|---|---|---|---|---|
| Experimental Example 1 | 2.26 | 1.41 | — | Ca: 0.00201 | 62.5 | Absent | Present |
| Experimental Example 2 | 2.07 | 1.42 | — | Ca: 0.00409 Sr: 0.00021 | 68.8 | Absent | Absent |
| Experimental Example 3 | 0.40 | 2.82 | Rb: 0.00282 | Ca: 0.0126 | 709 | Absent | Absent |
| Experimental Example 4 | 4.41 | 0.0261 | — | Ca: 0.183 Mg: 0.0815 | 6.59 | Present | — |

From the results indicated in Table 1, in Test 1 in which the applied voltage was 1 kV, in Experimental Examples 1 to 3 in which the ratio C was 55% or more, no void was observed in the vicinity of the interface between the ring portion 52 of the first end portion 11 and the first end portion 11 in the structure.

On the other hand, in Test 1 in which the applied voltage was 1 kV, in Experimental Example 4 in which the ratio C was less than 55%, a void was observed in the vicinity of the interface between the ring portion 52 of the first end portion 11 and the first end portion 11 in the structure.

From the above, it is considered that generation of a void in the insulating valve can be suppressed by setting the ratio C to 55% or more even in the operating X-ray tube.

What is claimed is:

1. An X-ray tube comprising:

a vacuum envelope including an insulating valve having a first end portion and a second end portion, and a metal portion joined to the first end portion;

an electron gun held at the first end portion via the metal portion in the vacuum envelope and configured to emit electrons; and a target held at the second end portion and configured to generate X-rays by receiving the electrons emitted from the electron gun, wherein a ratio C defined by the following Formula (1) is 55% or more at the first end portion, $$C = 100 \times ([K] + [R_1] + [R_2])/[Na] \quad (1)$$

(in the Formula (1), [Na] represents a content (atom %) of sodium, [K] represents a content (atom %) of potassium, [$R_1$] represents a content (atom %) of an alkali metal element having an atomic number larger than that of potassium, and [$R_2$] represents a content (atom %) of an alkaline earth metal element).

2. The X-ray tube according to claim 1, wherein the ratio C is 55% or more at the second end portion.

3. The X-ray tube according to claim 2, wherein the insulating valve further has a valve main body portion between the first end portion and the second end portion, and the ratio C is 55% or more at the valve main body portion.

4. The X-ray tube according to claim 1, wherein the ratio C is 63% or more at the first end portion.

5. The X-ray tube according to claim 1, wherein the ratio C is 1000% or less at the first end portion.

6. The X-ray tube according to claim 1, wherein the content of sodium in the first end portion is 2.20 atom % or less.

7. The X-ray tube according to claim 2, wherein the ratio C is 63% or more at the first end portion.

8. The X-ray tube according to claim 3, wherein the ratio C is 63% or more at the first end portion.

9. The X-ray tube according to claim 2, wherein the ratio Cis 1000% or less at the first end portion.

10. The X-ray tube according to claim 3, wherein the ratio Cis 1000% or less at the first end portion.

11. The X-ray tube according to claim 4, wherein the ratio Cis 1000% or less at the first end portion.

12. The X-ray tube according to claim 2, wherein the content of sodium in the first end portion is 2.20 atom % or less.

13. The X-ray tube according to claim 3, wherein the content of sodium in the first end portion is 2.20 atom % or less.

14. The X-ray tube according to claim 4, wherein the content of sodium in the first end portion is 2.20 atom % or less.

15. The X-ray tube according to claim 5, wherein the content of sodium in the first end portion is 2.20 atom % or less.

16. The X-ray tube according to claim 1, being a reflective X-ray tube.

17. The X-ray tube according to claim 1, being a transmission type X-ray tube.

* * * * *